(12) United States Patent
Stobbe et al.

(10) Patent No.: US 8,740,091 B2
(45) Date of Patent: Jun. 3, 2014

(54) FOLDED AND PRINTED CARE LABEL FOR TEXTILES

(75) Inventors: Anatoli Stobbe, Barsinghausen (DE); Norman Maass, Hannover (DE)

(73) Assignee: EYES OPEN Corporation, Carson City, NV (US)

( * ) Notice: Subject to any disclaimer, the term of this patent is extended or adjusted under 35 U.S.C. 154(b) by 0 days.

(21) Appl. No.: 13/391,872

(22) PCT Filed: Jul. 1, 2010

(86) PCT No.: PCT/DE2010/000760
§ 371 (c)(1),
(2), (4) Date: May 14, 2012

(87) PCT Pub. No.: WO2011/023151
PCT Pub. Date: Mar. 3, 2011

(65) Prior Publication Data
US 2012/0217308 A1    Aug. 30, 2012

(30) Foreign Application Priority Data
Aug. 25, 2009    (DE) .......................... 10 2009 038 511

(51) Int. Cl.
*G06K 19/06* (2006.01)
(52) U.S. Cl.
USPC ........................................ 235/492; 340/572.8
(58) Field of Classification Search
USPC ................. 235/492; 340/571–573.7
See application file for complete search history.

(56) References Cited

U.S. PATENT DOCUMENTS

| | | | |
|---|---|---|---|
| 5,508,684 A * | 4/1996 | Becker ....................... | 340/572.5 |
| 2006/0238436 A1 | 10/2006 | Deaett et al. | |
| 2007/0139201 A1 | 6/2007 | Stobbe | |
| 2007/0251207 A1 | 11/2007 | Stobbe | |
| 2008/0007479 A1 | 1/2008 | Hiltmann et al. | |
| 2008/0256785 A1 | 10/2008 | Deaett et al. | |
| 2009/0128338 A1 * | 5/2009 | Arai et al. .................. | 340/572.7 |
| 2009/0321531 A1 | 12/2009 | Speich | |
| 2011/0114734 A1 * | 5/2011 | Tiedmann et al. ............ | 235/492 |

OTHER PUBLICATIONS

English Translation of the International Preliminary Report on Patentability, PCT Application No. PCT/2010/000760, Apr. 12, 2012.
English Translation of International Search Report, PCT Application No. PCT/2010/000760, Feb. 1, 2012.
English Translation of Written Opinion of International Search Authority, PCT Application No. PCT/2010/000760, Apr. 2, 2012.

* cited by examiner

*Primary Examiner* — Christle I Marshall
(74) *Attorney, Agent, or Firm* — Jeffrey L. Thompson; Thompson & Thompson, P.A.

(57) ABSTRACT

A care label consists of a strip-shaped fabric band into which an antenna structure is sewn during the production of the fabric band. A small detection plate is fixed to the fabric band next to the fold line in the region of the antenna structure. To form the care label, the fabric band is folded along the fold line such that the antenna structures of the folded sections are superimposed after the folding process. The small detection plate comprises a chip with a coupling loop and together with the antenna structure forms a textile transponder.

10 Claims, 2 Drawing Sheets

FOLDED AND PRINTED CARE LABEL FOR TEXTILES

BACKGROUND OF THE INVENTION

1. Field of the Invention

The invention relates to a folded and printed care label for textiles.

2. Description of the Related Art

Items of clothing such as shirts, t-shirts, trousers and the like are known to have a fabric care label provided on the inside thereof, which label usually has information printed on one side. This information normally concerns instructions for care of the garment (cleaning and washing) and sometimes the name of the manufacturer of the item as well.

The care label in such cases comprises a strip-shaped fabric band that is folded in the middle, thus forming two sections that are superimposed on one another when the fabric band is folded. The printed side is then located on the two visible outer sides of the folded sections.

The printed information occupies a relatively large amount of space, so that the fabric band has to be quite long. It is therefore usual to fold the fabric band as described, thus halving the length of the care label.

In practice, there is a growing demand to include even more information on the clothing item, such as the color and size of the garment.

One conceivable solution might be to apply or print a barcode on the care label to this end, but under certain circumstances this may result in the care label becoming longer still.

Moreover, it has been found in practice that the use of barcodes is associated with disadvantages. For example, the barcode must always be exposed to view so that the information it contains can be read and scanned. This means that the garment has to be physically held and the care label positioned so that the barcode is visibly accessible for reading.

SUMMARY OF THE INVENTION

An object of the present invention is to provide a care label capable of holding and storing significantly more information for identifying the garment in question for production, logistics and distribution purposes for example, without the need for the label to be visible and without the care label having to be any longer.

This object is solved by providing a folded and printed care label for textiles having: an antenna structure woven into a section of a fabric band that forms a care label; a detector plate attached to the fabric band next to a centrally disposed fold line close to the antenna structure; and the fabric band being folded along the fold line to create two folded sections that each contain a portion of the antenna structure. The fabric band is folded in such manner that the portions of the antenna structure contained in the folded sections are superposed on one another after the fold is made. Other advantageous refinements of the invention are also described in the claims.

The invention suggests the use of a transponder, which has clear advantages over standard barcodes in terms of readability, the quantity of information that can be stored, and tampering protection. Such a transponder is known from the document WO 2005/071605 A2 for example.

The invention involves the following procedure. In order to form care labels, an antenna structure is first created in the strip-shaped fabric band while the strip-shaped fabric band is being produced. The antenna structure is preferably an electrical field transmitter. The fabric band is furnished with recurring reference marks, which serve as cutting marks and identify the points at which the fabric band is cut to produce a single care label.

In the case of plastic-coated care labels, the antenna may also be imprinted with a conductive dye or applied by means of an additional conductive coating. The surface feel of coated care labels is not as good, but they accept printing better. A tiny detector plate, known in its own right and comprising a chip with a circular coupling element, is applied to the fabric band close to the electrical field transmitter. Together the chip, the coupling loop and the electrical field transmitter form the actual functional textile transponder, which feels pleasantly like a textile since the care label is a fabric, unlike in the known plastic transponders, which are simply inserted in a textile pocket.

Since it is possible to produce very poorly conductive compounds in the textile production process, the detector plate is advantageously coupled to the woven or textile antenna structure inductively or capacitively, without contact.

The fabric band is folded in the middle in such manner that the antenna structures of the electrical field transmitter in the two folded sections are superimposed on one another. In this context, the antenna structure is preferably arranged to minor symmetrically about the fold line.

When the antenna structures are generally folded onto one another, or preferably they are superposed perfectly congruently with one another, in practice two antennas are coupled in parallel, thus forming a transponder with a very wide bandwidth. Accordingly, the transponder is largely unaffected by disturbances such as may occur for example when it is introduced into various textiles.

Thin conductive threads are used in the weaving process for producing the antenna structure from warp and/or weft threads. After the folding operation, these thin threads are lying on top of each other, so that a greater volume and a larger transmitting area are created with regard to the superimposed antenna threads. The conductive threads used are preferably insulated.

Surprisingly, it has been found during the inventive process that the transponder on the care label is functional even though the antenna structures of the two folded parts of the fabric band are superimposed on one another after folding, thus resulting in two parallel antennas. It was discovered that after the folding operation a new antenna structure is created, which has a different resonant frequency from the structure before folding. As a result of the new—folded—antenna structure, the transponder operates on a very broad band. At the same time, the quality of the antenna is correspondingly deteriorated, but even so the transponder is capable of performing its intended purpose, and the broadband resonant frequency is in the order of 860 MHz, as is desirable. This frequency differs considerably from the resonant frequency of the antenna structure when the fabric band is not folded.

The fabric band is preferably folded in such manner that the detector plate is covered by the one folded section and is thus arranged inside between the superimposed sections.

Certainly, the use of a transponder to identify textiles is known. This is done by attaching a transponder to the usual hang tag (made from paper or cardboard) on the garment. Unlike the conventional use, however, the invention provides a novel way for using a textile transponder with an antenna structure woven into it in a folded care label.

The textile transponder according to the invention has significant advantages over the hang tag furnished with a transponder. In the invention, the transponder it sewn in "with the first stitch" as it were while the care label is actually being produced, and it is fully operational as soon as the item of clothing furnished with the care label has been completed. This enables benefits from an early stage, since the item may be identified during production, treatment, packaging and shipping.

In contrast, the known transponder on the hang tag is not attached to the garment until later, or it is attached to the packaging, whereas the garment associated with the invention is immediately uniquely identifiable. Attaching a hand tag with a transponder is also not associated with any additional costs.

In the invention, the antenna is woven into the weave of the care label, producing what is referred to as a textile antenna. This textile antenna is considerably sturdier than the hang tag transponder.

In general, the textile transponder of the invention is extremely unsusceptible to textile processing or cleaning after shipping. In contrast, a hang tag made from paper or cardboard would disintegrate in the "tunnel finisher" in the first cleaning process after its production due to the high temperatures of the hot steam. This is why the hang tag cannot be attached until the end of the chain (supply chain) that extends from production to shipping, storage and finally the sale.

The textile transponder of the invention enables considerably more information to be stored than is possible with a normal barcode. Moreover, the transponder does not have to be physically visible in order to be readable.

Any item of clothing bearing the care label according to the invention may be identified uniquely and more accurately than with a barcode. For example, it may be used to determine that a given item X is item number Y in a total number Z in a series production run.

Other information that is important for logistics, warehousing and distribution may also be stored from the beginning.

The detector plate may be attached to the care label by gluing the detector plate to the strip-shaped fabric band.

In many cases, the garments together with the care labels undergo a highly aggressive enzyme washing step after production. In these cases, it cannot be guaranteed that the detector plate will not become detached. Therefore, the option also exists to sew the detector plate, that is to say the chip with the coupling loop, to the care label in the same way a spare button is sewn onto the care label.

It may also be considered an advantage of the invention that the transponder may also serve as an anti-theft device (EAS), thus eliminating the need for additional EAS identification.

BRIEF DESCRIPTION OF THE DRAWINGS

In the following, the invention will be explained in greater detail with reference to the embodiment shown in the drawings. In the drawings.

DETAILED DESCRIPTION OF THE INVENTION

Figure 1:
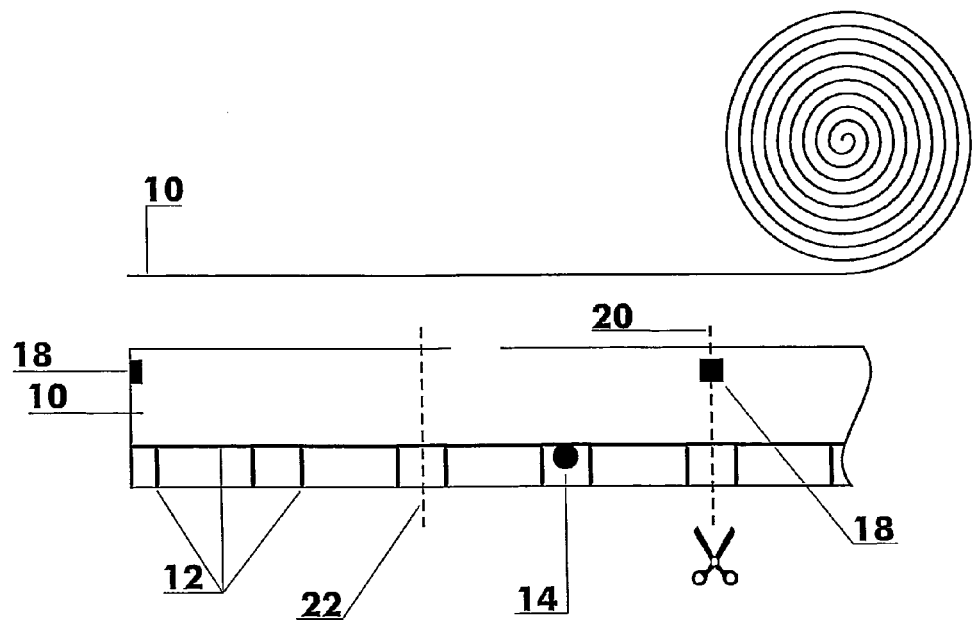
FIG. 1 shows a side view and a top view of a fabric band with a woven antenna and a detector plate.

FIG. 1 shows a strip-shaped fabric band 10 unwound from a roll for manufacturing a care label. An endless antenna is woven into the fabric band 10 as an electrical field transmitter 12. A detector plate 14—comprising in known manner a chip and a coupling loop—is stuck onto the lower part of fabric band 10, close to the location of electrical field transmitter 12 and in the middle between two vertically extending parts of electrical field transmitter 12.

Fabric band 10 is furnished with periodically recurring reference marks 18, which define cutting lines 20 along which fabric band 10 is cut to produce single care labels. In FIG. 1, fabric band 10 is printed on its reverse side.

Figure 2:
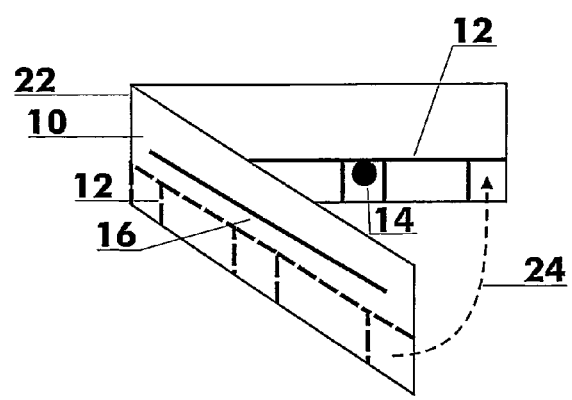
FIG. 2 shows a cut off section of a fabric band that is folded along a central fold line.

FIG. 2 shows how a folded care label is created from the cut off section of fabric band 10 by folding along a fold line 22. Dashed line 24 indicates the direction of the folding operation. The section is folded along central fold line 22 in such manner that the two antenna structures on the folded parts are superimposed on one another after the folding operation is complete, thus effectively forming two parallel antennas, and enabling the transponder to function over a very wide bandwidth. When fabric band 10 is folded together, both printed sides 16 are visible from the outside.

When fabric band 10 is folded together, detector plate 14 is located inside, between the folded parts of the fabric band, since it is covered by the lower part of fabric band 10 as shown in FIG. 2.

Figure 3:
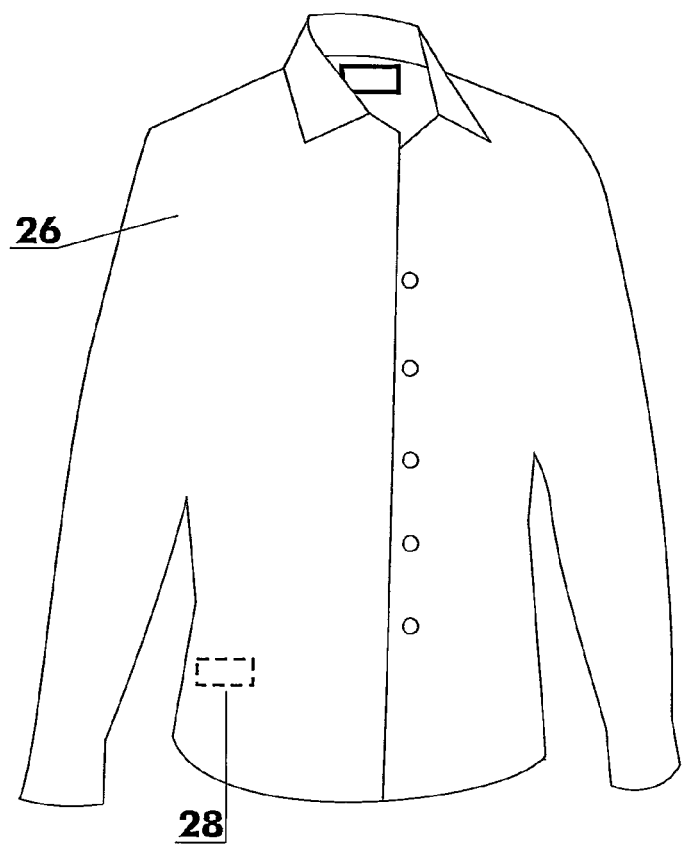
FIG. 3 shows an item of clothing fitted with a care label.

FIG. 3 shows an item of clothing 26, a shirt for example, on which care label 28 with a transponder has been attached to the inside, folded in accordance with the invention. The transponder functions for example in the UHF waveband, at about 900 MHz.

What is claimed is:

1. A folded and printed care label for textiles, comprising:
an antenna structure woven into a section of a fabric band that forms a care label;
a detector plate attached to the fabric band next to a centrally disposed fold line close to the antenna structure; and
the fabric band being folded along the fold line to create two folded sections that each contain a portion of the antenna structure, said fabric band being folded in such manner that the portions of the antenna structure contained in the folded sections are superposed on one another after the fold is made;
wherein the detector plate is sewn onto the care label.

2. The care label as recited in claim 1, wherein the antenna structure is arranged to minor symmetrically about the fold line.

3. The care label as recited in claim 1, wherein the portions of the antenna structure contained in the folded sections lie congruently with one another after folding.

4. The care label as recited in claim 1, produced by the following process:
a) while an endless, strip-shaped fabric band is being produced as the basic material for the care label, an endless antenna structure made from electrically conductive material is simultaneously woven into the fabric band,
b) the antenna structure is introduced as a warp or weft thread by means of a thread having a conductive element,
c) the antenna structure has a periodically repeating design,
d) the fabric band is furnished with periodically repeating reference marks that define cutting lines,
e) a cut off portion between two adjacent reference marks forms the basis for a single care label,
f) a detector plate comprising a chip and a coupling loop is located close to the antenna structure on the care label for coupling with the antenna structure, and
g) the cut off portion of the fabric band is folded along a central fold line.

5. The care label as recited in claim 1, wherein the antenna structure is formed by an electrical field transmitter.

6. The care label as recited in claim 1, wherein a new antenna structure is formed by the folding operation, which new antenna structure enlarges the bandwidth of the transponder.

7. The care label as recited in claim 1, wherein the detector plate is coupled without contact into the woven and folded antenna structure.

8. The care label as recited in claim 1, wherein the antenna structure is formed by a conductive dye printed onto the fabric band that has been coated with plastic.

9. The care label as recited in claim 1, wherein the fabric band is coated with plastic, and the antenna structure in the fabric band is formed by an additional conductive coating.

10. The care label as recited in claim 1, wherein antenna threads are woven into the fabric band to form the antenna structure, said antenna threads comprising insulated wires.

* * * * *